(12) United States Patent
Chaddha et al.

(10) Patent No.: US 8,504,633 B2
(45) Date of Patent: *Aug. 6, 2013

(54) METHOD AND SYSTEM FOR COMMUNICATING A DATA FILE

(75) Inventors: Navin Chaddha, Cupertino, CA (US); Adesh Desai, Northridge, CA (US); Sanjeev Kuwadekar, Northridge, CA (US); Dan Sodhi, Northridge, CA (US)

(73) Assignee: Kirusa Inc., New Providence, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,869

(22) Filed: Apr. 12, 2012

(65) Prior Publication Data

US 2012/0202535 A1 Aug. 9, 2012

Related U.S. Application Data

(63) Continuation of application No. 10/852,845, filed on May 24, 2004, now Pat. No. 8,161,116.

(60) Provisional application No. 60/472,989, filed on May 23, 2003, provisional application No. 60/472,990, filed on May 23, 2003, provisional application No. 60/472,994, filed on May 23, 2003, provisional application No. 60/510,214, filed on Oct. 9, 2003, provisional application No. 60/520,471, filed on Nov. 13, 2003.

(51) Int. Cl.
*G06F 15/16* (2006.01)

(52) U.S. Cl.
USPC .......................................... 709/206; 709/203

(58) Field of Classification Search
USPC ................................................. 709/206, 203
See application file for complete search history.

(56) References Cited

U.S. PATENT DOCUMENTS

| | | | | |
|---|---|---|---|---|
| 4,582,959 A * | 4/1986 | Myslinski et al. | ......... | 379/88.12 |
| 6,192,407 B1 * | 2/2001 | Smith et al. | .................. | 709/229 |
| 6,269,369 B1 * | 7/2001 | Robertson | ............................. | 1/1 |
| 6,389,276 B1 * | 5/2002 | Brilla et al. | .................. | 455/413 |
| 6,707,891 B1 * | 3/2004 | Guedalia | .................... | 379/88.17 |
| 7,117,245 B1 * | 10/2006 | Levkoff et al. | ................ | 709/206 |
| 7,130,388 B1 * | 10/2006 | Bell | ........................... | 379/88.12 |
| 7,167,701 B1 * | 1/2007 | Jordan, Jr. | .................. | 455/412.2 |
| 7,218,709 B2 * | 5/2007 | Garg et al. | ................. | 379/88.12 |
| 7,376,139 B1 * | 5/2008 | McDonald et al. | ........... | 370/410 |
| 7,483,525 B2 * | 1/2009 | Chaddha et al. | ......... | 379/142.07 |
| 2001/0034791 A1 * | 10/2001 | Clubb et al. | .................. | 709/238 |
| 2003/0046433 A1 * | 3/2003 | Luzzatti et al. | ............... | 709/248 |
| 2003/0097407 A1 * | 5/2003 | Litwin et al. | .................. | 709/204 |
| 2004/0023643 A1 * | 2/2004 | Vander Veen et al. | ......... | 455/413 |
| 2004/0177159 A1 * | 9/2004 | Butterfield et al. | ........... | 709/246 |
| 2005/0018820 A1 * | 1/2005 | Chaddha et al. | ........... | 379/88.13 |
| 2005/0053221 A1 * | 3/2005 | Reding et al. | ............. | 379/211.02 |
| 2005/0220064 A1 * | 10/2005 | Hundscheidt et al. | ........ | 370/342 |

* cited by examiner

*Primary Examiner* — Waseem Ashraf
(74) *Attorney, Agent, or Firm* — Ash Tankha; Lipton, Weinberger & Husick

(57) ABSTRACT

A method and system for forwarding information such as data files to a recipient across disparate or incompatible communication networks, which are not constrained by incompatible user devices. The sender sends information such as a data file to an intended recipient via a messaging server. The messaging server communicates with the intended recipient using basic communication tools that are generally compatible regardless of the network that the recipient is subscribed to. The messaging server stores the information, creates and sends a notification message to the intended recipient that she has information to be retrieved. The notification message includes a unique access address associated with the message, at which the recipient can retrieve the information. Different unique access addresses are associated with different messages.

19 Claims, 8 Drawing Sheets

METHOD AND SYSTEM FOR COMMUNICATING A DATA FILE

CROSS REFERENCE TO RELATED APPLICATIONS

This application is a continuation of patent application Ser. No. 10/852,845, titled "Method and system for communicating a data file over a network", filed in the United States Patent and Trademark Office on May 24, 2004 now U.S. Pat. No. 8,161,116, which claims priority of the following U.S. provisional patent applications: Ser. No. 60/472,989, filed May 23, 2003; Ser. No. 60/472,990, filed May 23, 2003; Ser. No. 60/472,994, filed May 23, 2003; Ser. No. 60/510,214, filed Oct. 9, 2003; and Ser. No. 60/520,471, filed Nov. 13, 2003. These related applications are incorporated herein by reference and made a part of this application as if fully set forth herein.

BACKGROUND

1. Field of the Invention

The present invention relates to messaging, particularly to transmitting data files over a communication network.

2. Description of Related Art

In telecommunication networks, such as cellular wireless networks, various messaging services are available to the subscriber/users, as alternative means of communicating short of calling one another, at times when the initiating party and the intended recipient may not be simultaneously available for or may not desire real time voice communication to take place between them. Such messaging services include voicemail messaging, short message service (SMS) text messaging, multi-media messaging service (MMS), etc. Some of these services are carrier, provider, network or platform dependent (collectively referred hereinafter as network dependent, as opposed to network independent), and some are user device dependent. Network dependent refers to messaging services that would work in one network (e.g., carrier, provider, platform or physical network) but not another, because of differences in operating parameters, specification, limitations, and other characteristics among the different carriers, providers, platforms or physical networks. Such differences may include incompatibilities arising from underlying technologies, communication frequencies, communication platform which may be viewed as the underlying hardware and software that handles communication over a network, communication protocol which may be viewed as the way data is exchanged among user devices, or simply the physical or operational restrictions network providers and carriers imposed to distinguish their services.

For example, in cellular carrier networks, voicemail messaging has been network dependent. Each network may be associated with a different provider that implements a different hardware and/or software platform, and/or utilizes a different set of communication and/or data protocols. For voicemails, each cellular carrier (e.g., AT&T, Verizon, Cingular, etc.) maintains a proprietary voicemail system within its own carrier network. While a person in one cellular carrier network may call another person in another cellular carrier network to leave a voicemail message, voicemails cannot be transferred from one cellular carrier network to another by messaging. However, within the same cellular carrier network, a sender can record a message and forward the message to a designated recipient. Heretofore, voicemail messaging is not available across dissimilar cellular carrier networks and dissimilar platforms within the same network.

SMS text messaging is typically not network dependent. As long as a carrier offers SMS text messaging as a service to its customers, SMS text messaging is compatible over disparate cellular carrier networks. A sender in one network can send an SMS text message to a recipient in another network. Most cellular handsets are enabled with SMS text messaging function. However, SMS text messages have character limitations (typically 160 characters), and a sender may need to send multiple text messages to fully communicate his message. Furthermore, a sender is required to use the awkward text entry interface of a cellular phone to input his message. Voicemail messaging would be the more desirable option in some situations, subject to its network and platform dependency.

MMS offers additional functionalities to support messaging of multi-media files, such as audio, video, graphics, photos, images, music, and other types of digital data. MMS is user device and network dependent. However, while some of the modern cellular handsets may have the capabilities to handle MMS functions, not all handsets are enabled to do so. For a sender of a MMS message, he cannot be certain that the intended recipient has the appropriate handset on the appropriate network that is enabled to receive MMS message.

The above-mentioned incompatibility issues relating to the various messaging services are exacerbated when a sender wishes to send text messages, voice messages and/or multi-media files across disparate networks to disparate devices. The incompatibility issues are further exacerbated for messaging between different categories of communication networks, e.g., voicemail messaging cannot be conducted between a landline phone operating in a public switched telephone network (PSTN) and a cellular phone operating in a cellular network; a landline telephone cannot receive a text message. The differences between providers and devices can create incompatibilities that prevent the receipt of, for example, text messages, voice messages, and multimedia files, across disparate networks.

United Kingdom Patent Application Number 2,387,737 to Munnariz purportedly discloses a telephone message network that stores a voice message from a sender to a recipient. According to its abstract, the sender is prompted by the network to supply, with the voice message, information identifying the recipient, and the network sends a text message to the recipient announcing the existence of the voice message. When the recipient calls to retrieve her voice message, the network selects the appropriate voice message using calling line identity (CLI) to identify the calling device of the intended recipient of the message. The number called by the recipient to retrieve voice message is not uniquely associated with the voice message. Since any person may call the same number to retrieve their own messages, the system can only distinguish between the callers by the callers' CLI. This system does not actually authenticate the caller, as anyone calling with the correct calling device would be presumed to be the intended recipient of the message. Further, this system does not support other types of messaging, such as MMS.

Accordingly, it is desirable to provide an improved messaging system that will enable a sender to send information including data files, such as SMS text messages, voice messages, multimedia files, image files, text files and executable files to a recipient who is not in the same carrier network as the sender.

SUMMARY OF THE INVENTION

The present invention is directed to an improved method and system for forwarding information such as data files to a recipient across disparate or incompatible communication networks, which are not constrained by incompatible user devices. The sender sends a message to an intended recipient via a messaging server. The sender is a subscriber of the messaging server, thus the sender device is compatible with the messaging server. In accordance with the present invention, the messaging server communicates with the intended recipient using basic communication tools that are generally compatible regardless of the network that the recipient is subscribed to.

In one aspect of the present invention, a sender using a sender device such as a cellular phone, personal digital assistant (PDA), portable computer, personal computer or landline phone sends a message or information to a messaging server. The information may include a data file. Examples of a data file include a voice message, text document, a musical file, a picture file, an executable file and a multimedia file. The messaging server stores the information, creates and sends a notification message to the intended recipient that she has information to be retrieved. The notification message may be in the form of a SMS text message, voice call, or other means of notification that are network independent, or compatible over disparate networks.

The notification message includes a unique access address associated with the message. Different unique access addresses are associated with different messages. In one embodiment, the unique access address may contain a phone number the recipient can call to retrieve her message. The messaging server authenticates the caller to be the intended recipient based on the called number and/or the Caller ID of the caller, and presents the message that had been associated with the unique access address. In another embodiment, the notification message may contain a link to a specific location such as a website where a data file such as a picture file or text document can be downloaded by the recipient. A recipient may use message retrieval devices that may be different from the user device that received the notification message, particularly where the user device may not be compatible with or enabled to retrieve the type of message at the specified location.

The present invention is particularly suitable for use in cellular communication systems.

DETAILED DESCRIPTION OF THE INVENTION

The present description is of the best presently contemplated modes of carrying out the invention. This description is made for the purpose of illustrating the general principles of the invention and should not be taken in a limiting sense. The scope of the invention is best determined by reference to the appended claims.

The present invention is directed to a method and a system for communicating data files across a single or multiple communication networks. To facilitate an understanding of the principles and features of the present invention, they are explained herein below with reference to its deployments and implementations in illustrative embodiments. By way of example and not limitation, the present invention is described herein-below in reference to examples of communicating messages containing information or data file over cellular networks, such as voice messages and multimedia data files.

The present invention can find utility in a variety of implementations without departing from the scope and spirit of the invention, as will be apparent from an understanding of the principles that underlie the invention. It is understood that the messaging concepts of the present invention may be applied to business and personal communications, and may be implemented by commercial as well as private communication networks.

Figure 1:
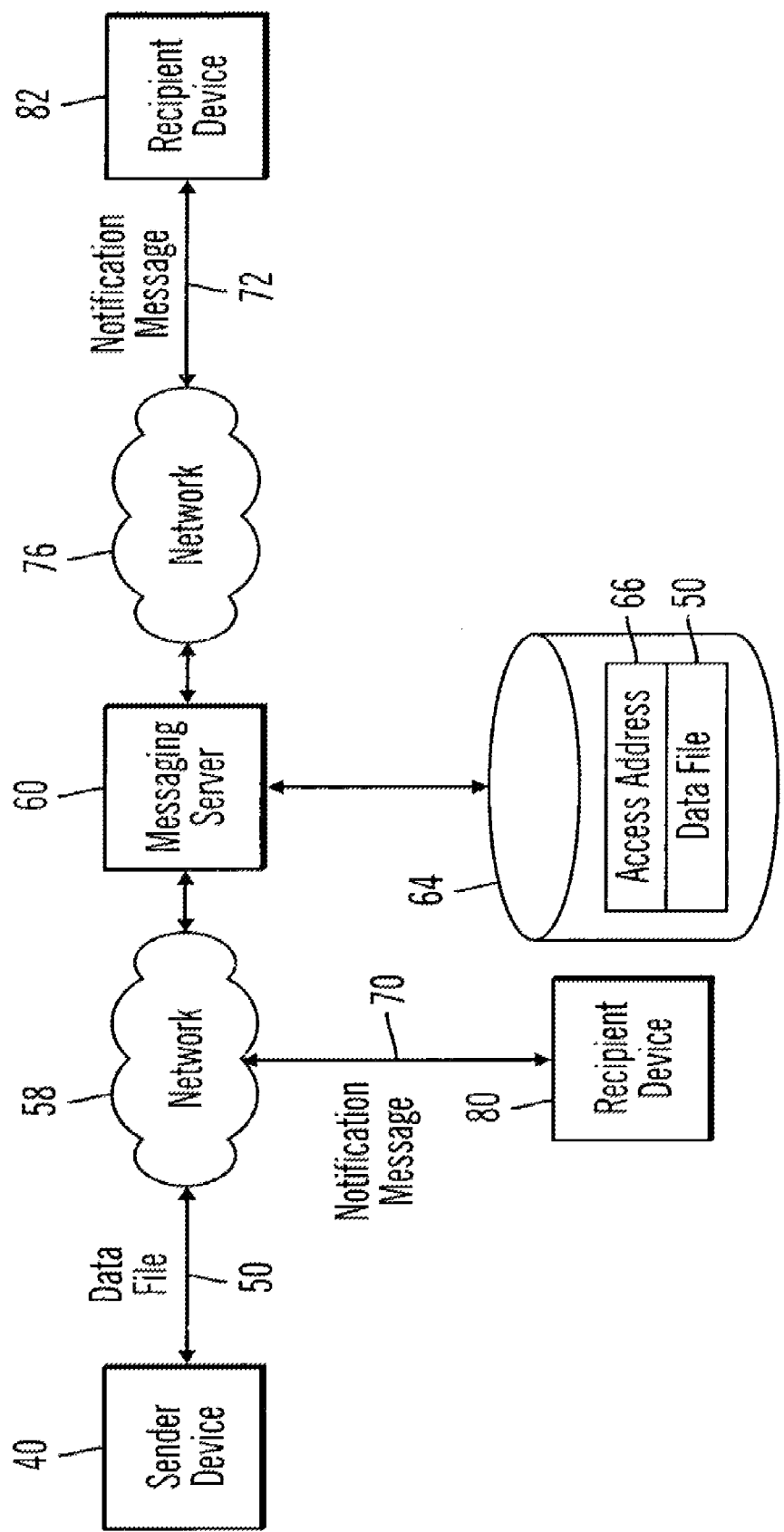
FIG. 1 is a schematic representation of a messaging network through which a sender transmits a data file from a sender device to a recipient device according to one embodiment of the present invention.
Figure 7:
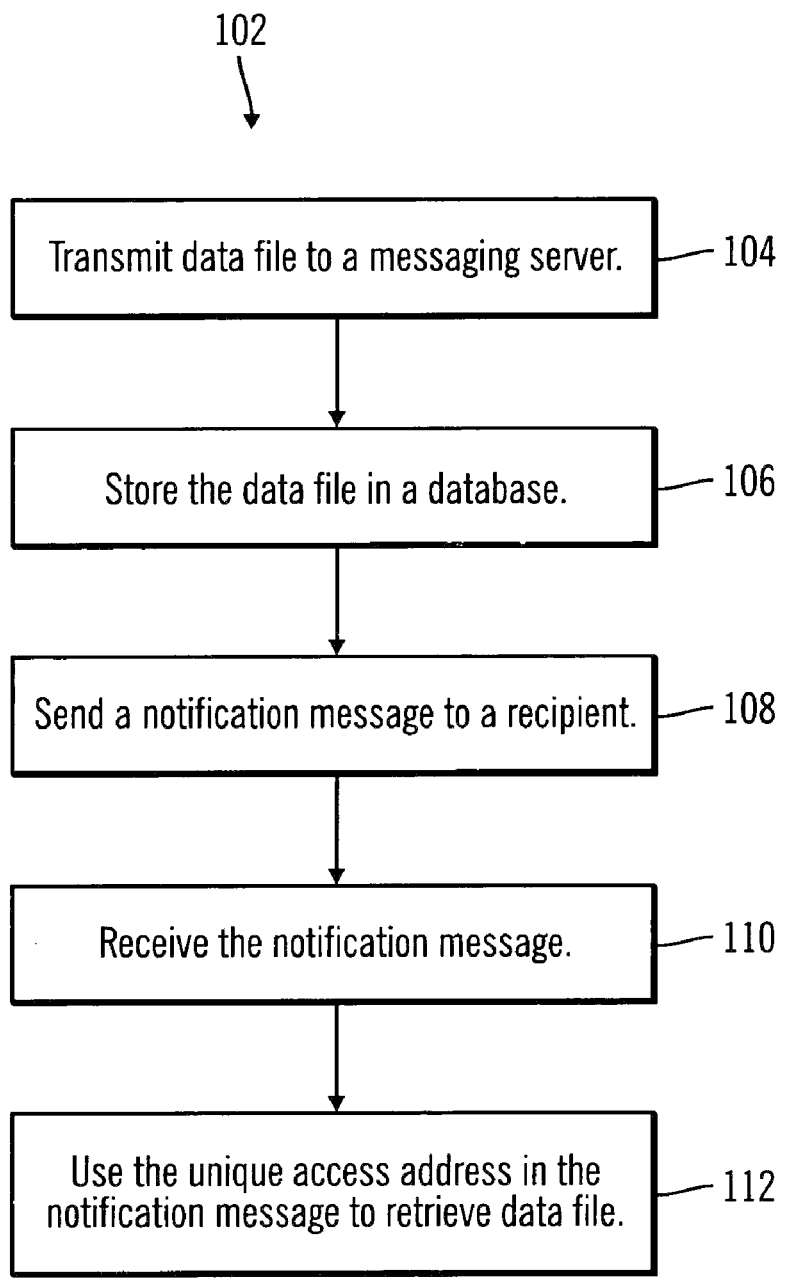
FIG. 7 is a flowchart illustrating a method for transmitting a data file from a sender device to a recipient device according to one embodiment of the present invention.

FIG. 1 is a diagram illustrating an embodiment of the present invention where a sender device 40 transmits a data file 50 to a recipient device 80, 82. FIG. 7 is a flow diagram 102 illustrating the steps in this embodiment. The sender 40 transmits (at step 104) via communications network 58 the data file 50 to a messaging server 60, along with the intended recipient's notification address (e.g., cellular phone number, landline phone number, email address, instant message ID, etc.). The network 58 may include cellular network, telephony network (e.g., landline or PSTN), data network, Internet, or other types of communications networks. The sender 40 may specify more than one recipient of the same data file. The messaging server 60 stores (at step 106) the data file 50 in a database 64 and sends (at step 108) a notification message 70, 72 to the recipient 80, 82, respectively, based on the recipient's notification address. Depending on the network the recipient is subscribed to, the recipient 80, 82 may be sent the notification message 70, 72 through the same network 58 as the sender 40, or through a different network 76, respectively. The notification message 70, 72 contains a unique access address 66, which is assigned to be associated with the data file 50. The notification message 70, 72 may also include message ID, name of data file, sender's identification, size of message, date and time of message, and other relevant information, which may be provided by the sender or the system (e.g., time and date). The notification message 70, 72 usually do not include any substantive part of the content of the message or data file, to avoid exceeding the notification messaging limitation. Although in one embodiment of the present invention, content of the message or data file is sent as an attachment to the notification to the recipient device, depending on the capabilities of the device. The recipient 80, 82 receives (at step 110) the notification message 70, 72 and using the unique access address 66 retrieves (at step 112) the data file 50. The unique access address may be an access address to contact the messaging server 60. The unique access address may include a phone number and/or web address. The network through which the notification message is sent to the recipient may be different from the network through which the message is retrieved by the recipient.

Figure 2:
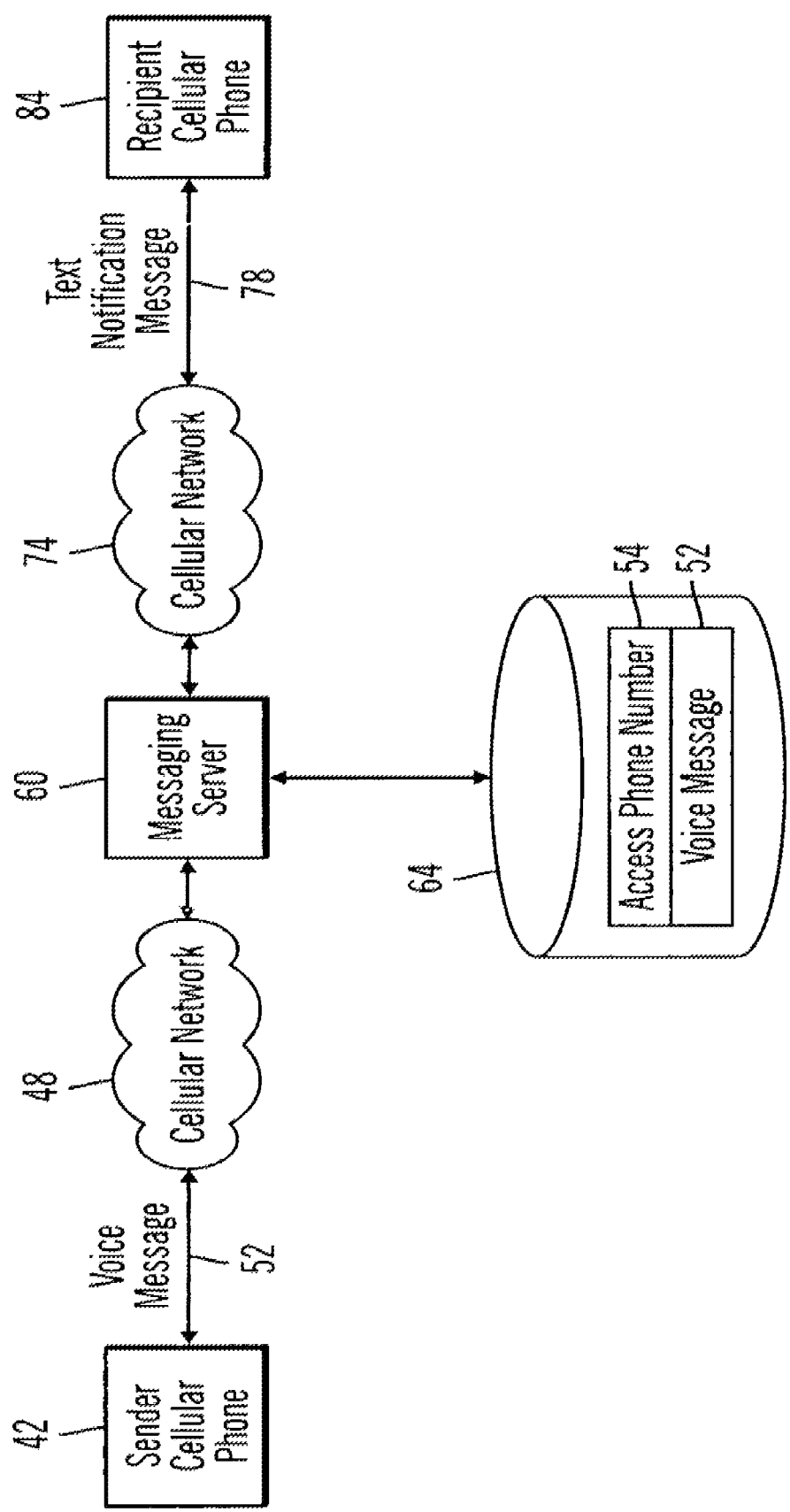
FIG. 2 is a schematic representation of a messaging network through which a sender transmits a data file from a sender cellular phone to a recipient cellular phone according to one embodiment of the present invention.

FIG. 2 is a diagram illustrating an embodiment of the present invention where a sender device is a cellular phone 42 that transmits a voice message 52 to a recipient device 84 that is also a cellular phone. (Other embodiments, not shown, may include sending data files over the Internet network, to recipient devices such as PDAs and PCs.) The sender cellular phone 42 transmits the voice message 52 to a messaging server 60. The messaging server 60 stores the voice message 52 in a database 64 and sends a notification text message 78 to recipient cellular phone 84. The recipient cellular phone 84 may be sent the notification text message 78 through the same network 48 as the sender cellular phone, or through a different network 74 depending on the recipient's network. In one embodiment, the recipient network may be different than the network of the sender, with respect to, for example, communication protocol, operating frequency, operating platform or other operational and/or functional aspects that render the sender and recipient networks incompatible for direct messaging of the sender's data file.

The notification text message 78 contains a unique access phone number 54 that is assigned to be associated with the voice message 52. The recipient cellular phone 84 receives the notification text message 78 and calls the unique access phone number 54 to retrieve her voice message 52. In one embodiment, the access phone number may not be visible to the recipient, but rather, is associated with a menu prompt. The access phone number is dialed if the recipient responds by pressing a specified button on the menu prompt on the recipient cellular phone.

In one embodiment, the messaging server 60 identifies the unique access address used by the recipient device through a dialed number identification service (DNIS). The DNIS may be provided by the telephony network used by the recipient to retrieve her data file. The network may also provide the access phone number by transmitting DTMF tones to the messaging server 60 from a local central office. The messaging server 60 selects the data file from the mass storage device that is associated with the unique access address and then transmits such corresponding data file to the recipient.

In addition or in the alternate, the caller to the messaging server may be requested to authenticate herself as the intended recipient upon access to the messaging server 60. This is to provide additional security in case a person who is not the intended recipient was to intentionally impersonate the recipient by dialing the unique access number associate with data file from the sender, or was to accidentally dial such unique access number. The authentication process may involve the caller having to input the intended recipient's notification address (e.g., the recipient's cell phone number) and/or personal identifying information such as one or more of name, user ID, unique personal identification number code (PIN code). The messaging server 60 authenticates the caller as the intended recipient upon matching the unique access number to the callers authenticating information (e.g., recipient's cell phone number, PIN, etc.). In another embodiment, the messaging server 60 may be configured to authenticate the caller as the intended recipient if the caller's Caller ID (or Automated Number Identification "ANI") matches the recipient notification address. In such embodiment, the recipient must be calling from the same device as the notification address. In another embodiment, the recipient may use a different device to retrieve a data file sent by the sender. For example, the data file is a relatively large multi-media file, and the recipient's cellular device notified by the messaging server 60 is not compatible to download a file of that size and/or a multimedia file. The recipient can well use a PDA or PC to contact the messaging server 60 at the assigned unique access address to download the large multimedia file.

Figure 6:
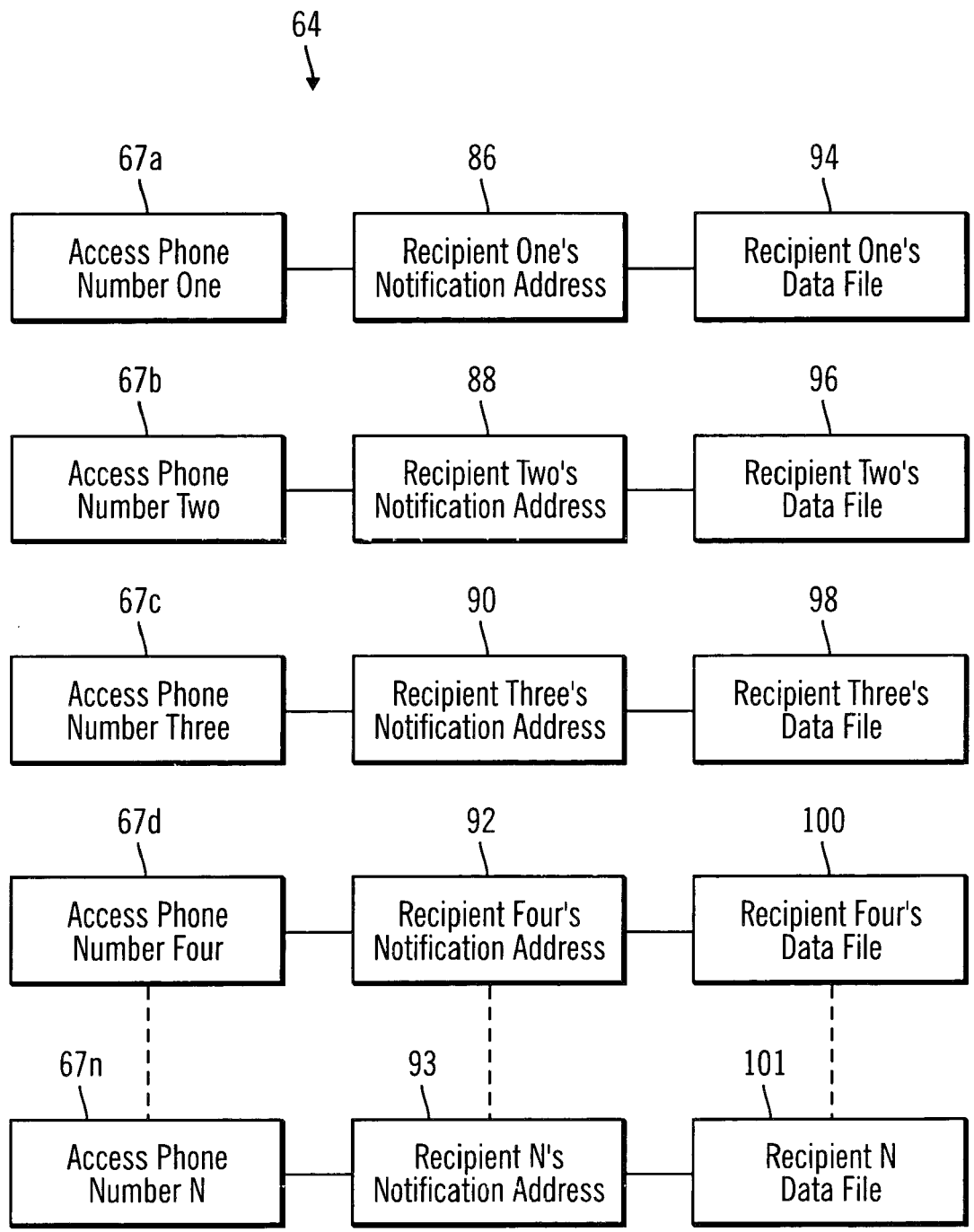
FIG. 6 is a schematic representation of a messaging server that associates a data file with an address of a recipient device according to one embodiment of the present invention.

FIG. 6 illustrates the situation in which one or more senders send different message data files to more than one intended recipients. In this embodiment, a database 64 associates a data file 94, 96, 98, 100, 101 with the addresses of 86, 88, 90, 92, 93 of different recipients, respectively. A plurality of data files 94, 96, 98, 100, 101 are associated with a plurality of recipient notification addresses 86, 88, 90, 92, 93 and each recipient notification address 86, 88, 90, 92, 93 is associated with a single unique access address (e.g., access phone numbers 67*a*, . . . , 67*n*), respectively. Specifically, recipient one's data file 94, recipient two's data file 96, recipient three's data file 98, recipient four's data file 100 and recipient n's data file 101 are also associated with recipient one's notification address 86, recipient two's notification address 88, recipient three's notification address 90, recipient four's notification address 92, and recipient n's notification address 93, respectively. In addition, recipient one's data file 94, recipient two's data file 96, recipient three's data file 98, recipient four's data file 100 and recipient n's data file 101 are also associated with recipient one's unique access address 67*a*, recipient two's unique access address 67*b*, recipient three's unique access address 67*c*, recipient four's unique access address 67*d*, and recipient n's unique access address 67*n*, respectively.

When a recipient retrieves her data file (one of 94, 96, 98, 100, 101) using one of the unique access addresses 67*a* to 67*n*, the recipient notification address 86, 88, 90, 92, 93 and the unique access address dialed are identified by the messaging server 60, and the messaging server 60 offers the corresponding recipient data file 94, 96, 98, 100, 101, respectively, to the recipient. In this embodiment, it is contemplated that the recipient device receiving the notification message is the same device that retrieves the data file, so the recipient's device address can be automatically determined by Caller ID or ANI. If the recipient uses a different device to retrieve the data file, the messaging server 60 may require additional authentication procedure as describe above.

In the event the sender wishes to send the same data file to more than one recipients (e.g., sending the data file to a distribution list of recipients), the messaging system 60 can be configured to send the same notification message with the same unique access address associated with the same data file to the multiple recipients. In this case, to send the same data file to n recipients, the unique addresses 67*a*-67*n* would be the same, and the recipient data files 94, 96, 98, 100 and 101 would be the same. Only one copy of the data file is required to be maintained by the messaging server 60, which may be accessed by multiple recipients. Alternatively, each recipient may be assigned a unique access address even for the same data file.

The messaging server may resend the notification message if the data file is not retrieved within a predetermined period of time. In one embodiment, a notification message is not sent while the sender is accessing the messaging server, but rather, is queued for later delivery, depending on a number of factors, such as (a) available bandwidth; (b) priority of the message designated by the sender; (c) whether the recipient address involves a long distance call; (d) whether recipient is in the same network as the sender; and any other relevant factors. In another embodiment, the notification message is sent immediately once the recipient's contact information is known, and the message completed.

The notification message may comprise in addition to, or alternatively to, a text message, a voice message and/or an electronic mail. A voice notification message is typically used where the recipient is to be notified through a landline phone that cannot receive a text message. The messaging server 60 dials the recipient's landline phone through a PSTN and transmits an audible voice notification message that provides an access phone number with which the recipient can dial to hear her voice message. In addition, the messaging server 60 may auto-connect the recipient to the access phone number, as explained elsewhere herein. The recipient device 40 may comprise a cellular phone, a PDA and/or portable computer, a landline phone and a personal computer. The unique access address may comprise a phone number and/or a website address. In one embodiment, the notification message provides a website address where the data file can be downloaded, and in one embodiment, the website address may appear in a text notification message and/or a voice notification message.

In another embodiment, if the sender wishes to provide redundancy, and if the intended recipient has more than one device to which notification messages may be sent, the sender may elect to have the messaging server 60 send a notification message to more than one recipient device. After the recipient retrieved the message associated with the notification message, a cancellation message is sent by the messaging server 60 to all the recipient devices that earlier received message notification, to avoid the recipient the inconvenience of attempting to retrieve a message that has already been retrieved.

Figure 8:
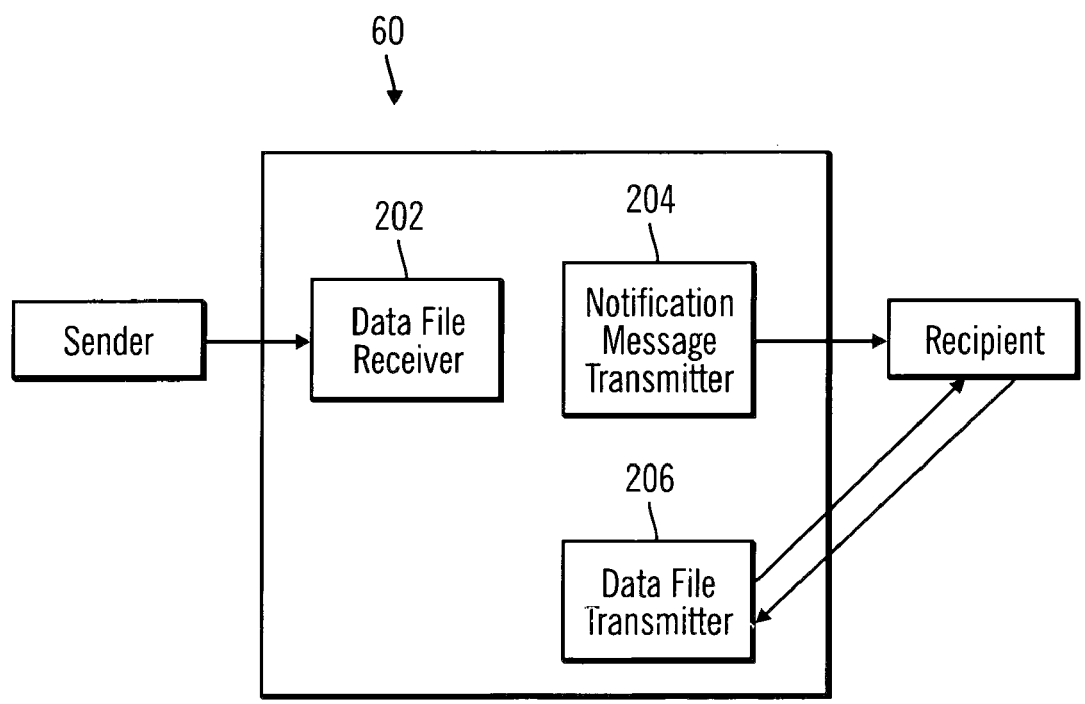
FIG. 8 is a schematic representation of a messaging server according to one embodiment of the present invention.

Referring to FIG. 8, the messaging server 60 may comprise a data file receiver 202 for receiving the data file from the sender device, a notification message transmitter 204 for transmitting the notification message to the recipient, and a data file transmitter 206 for transmitting the data file to the recipient upon the recipient access of the messaging server 60. Example of a notification message transmitter 204 include a module or an interface to short message service center (SMSC) gateway server or short message peer to peer (SMPP) gateway server, interfaces to email servers using standard protocols such as POP3/IMAP4, SMTP as well as proprietary protocols such as MAPI/CDO, and interfaces to voice mail systems or direct dialing over PSTN or IP network. An example of a data file receiver includes a module that accommodates sending data file from the sender device to the messaging server over circuit-switched or packet switched network, over protocols such as HTTP, SMS, MMS, etc. An example of a data file transmitter includes a module that accommodates sending data file from the message server to the recipient device over circuit-switched or packet-switched network over protocols such as HTTP, SMS, MMS, etc. The messaging server 60 is illustrated as being in communication with a network, but may also be integrated with a network, for example the cellular network of the sender.

Figure 5:
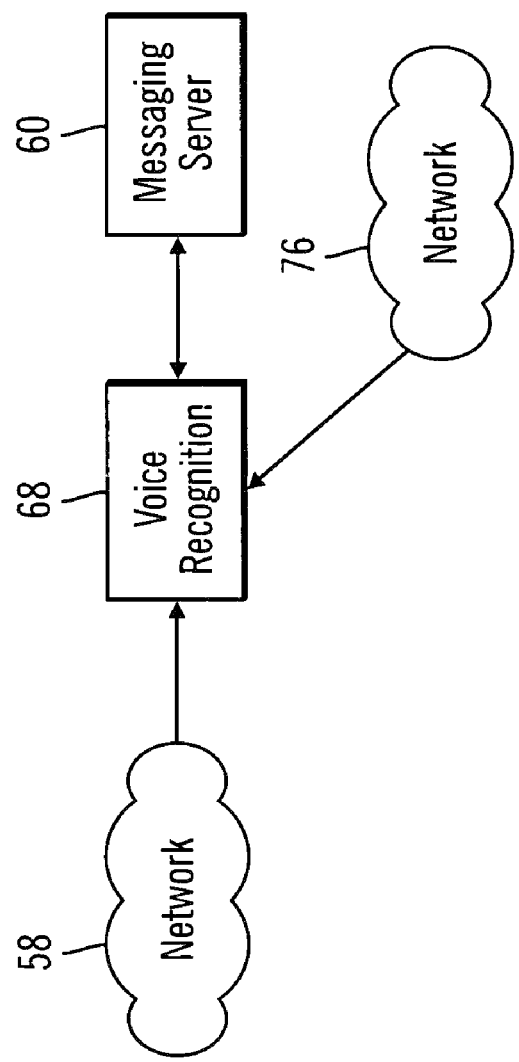
FIG. 5 is a schematic representation of a messaging server and a voice recognition device according to one embodiment of the present invention.

Referring to FIG. 5, in an embodiment, the messaging server 60 is configured with a voice-recognition unit 68 implementing voice-recognition processing. An example of voice-recognition processing includes a suite of Voice Manager Products developed by HeyAnita Inc. of Burbank, Calif. and is herein incorporated by reference. Reference is also made to U.S. patent Publication No. US 20030078779A1, assigned to the assignee of the present invention, which discloses an interactive voice response system, and is fully incorporated by reference herein. Another example of voice-recognition programming is disclosed in U.S. Pat. No. 6,501,966 to Bareis et. al. and is herein incorporated by reference as well. In this embodiment, the sender may pre-program contact information including a recipient's name and phone number, and associate the phone number with a recipient's name. When sending a message, the sender may speak the name of the recipient and the messaging server 60 will identify the recipient's contact information using the voice-recognition unit 68. If the recipient's phone number has not been pre-programmed, the sender may speak the recipient's phone number, and the messaging server will identify the recipient's phone number using the voice-recognition unit 68. Examples of commands that may be implemented by DTMF recognition and/or voice-recognition include, but are not limited to, dialing, web browsing, calling, bringing up a contact list, adding a contact, removing a contact, stopping a call, entering additional recipient phone numbers, etc.

The sender may indicate the recipient or recipients of the data file using the sender device. In one embodiment, the sender inputs the recipient device address into a sender device, such as a cellular or landline phone. The messaging server detects the recipient device address using dual tone multi frequency DTMF recognition, voice recognition, and/or over IP-based network. DTMF and voice recognition may also be used to navigate a menu to interact with the messaging server and to select a recipient device address that has been pre-programmed into the messaging server.

Further, the sender may have access to an address book stored on the messaging server 60 or on a sender device. In one embodiment, a global address book lists the names and contact information of all subscribers to the messaging server. The contact information can include, but is not limited to, phone numbers and electronic mail addresses. A sender may also choose to create his own personal address book which lists only the contact information of people the sender has placed in the address book. Often a sender may send a data file to a new recipient who is not listed in an address book. When the sender sends the new recipient a data file the messaging server detects whether the contact information of the new recipient is contained within an address book. If the new recipient's contact information is not present in an address book, the messaging server prompts the sender to add the new recipient's contact information.

A sender may also group recipients into a distribution list where the sender need only select the distribution list as the recipient to send a data file to each member of the distribution list. Each member of the list may have different types of recipient devices. Also, a distribution list may be created that sends a data file to multiple devices of a single recipient.

In another embodiment the present invention, the messaging server 60 communicates with the sender device, and downloads the contact information of recipients stored in the sender device. The contact information is then placed within an address book. For example, a cellular phone may have a memory card (such as a SIM card) that functions as a memory device for storing contact information. The SIM card allows the user of the cellular phone to add and delete contact information. The messaging server may download the contact information contained in the SIM card. In this embodiment of the invention, a user of the cellular phone may make changes to the contact information on the SIM card, and these changes would be reflected on the address book contained at the messaging server and vice versa. To keep the contact information of the sender updated, the messaging server may periodically query the cellular phone or the cellular phone may transmit changes in its SIM card to the messaging server each time changes are made to the stored contact information.

Referring again to FIG. 1, the sender device 40 may comprise in addition to a cellular phone, a PDA and/or portable computer, a fixed device such as a landline phone and a personal computer. Each sender device 40 may transmit different types of data files 50 over different types of networks, collectively represented by network 58. A data file 50 can include, but is not limited to, analog and digital voice messages, text files, image files, executable files, music files, audio files, video files, multimedia files, and voice over Internet protocol (VOIP) transmissions. Different types of networks (58, 76) include cellular networks, wide area networks such as the Internet, local area networks, telephony networks and PSTN's. Examples of different sender devices using different networks include a portable computer transmitting a voice message over a cellular network to the messaging server 60. The personal computer may transmit a text message and/or a voice message over a data network such as the Internet. The personal computer may use a voice over Internet protocol (VOIP) to transmit the voice message. The landline phone may transmit a voice message to the messaging server through a PSTN.

Similarly, the recipient's device 82 may comprise in addition to a cellular phone, similar devices as the sender device 40 noted above.

In one embodiment, the sender device may be enabled to capture audio, video and/or multimedia files, and transmitting them over IP or PSTN network to the message server. This transmission can occur using store-and-forward or streaming. This can occur over variety of protocols such as SMS, HTTP, MMS etc. Similarly, the files may be sent to the recipient device from the message server over IP or PSTN network. This transmission can occur using store-and-forward or streaming. This can occur over variety of protocols such as SMS, HTTP, MMS etc.

In one embodiment, a data file such as a voice message may be created by converting a text message to a voice message. A text message is provided to the messaging server 60 via the sender device 40 and the text message is converted to a voice message using a text-to-speech conversion process known in the art. With text-to-speech conversion, the text message is converted to audible sounds, allowing the recipient to hear the text message as a voice message. The text message may be converted to a voice message by the sender device 40 or may be converted by the messaging server 60. In one exemplary embodiment, a sender using a cellular phone wishes to send a text message to a recipient, but the recipient only has access to a landline phone that is not able to receive the text message. The sender sends a text message to the messaging server 60. The text message is converted to a voice message using a text-to-speech conversion process, so that the recipient can retrieve the voice message converted from the text message using the landline phone.

In another embodiment, a sender may send a data file in the form of a text message to a recipient using the messaging server 60. However, the sender wishes to dictate the text message. A speech-to-text processing may be used to convert the sender's speech into a text message. The speech-to-text processing may be enabled at the sender device or may be performed by the messaging server.

Figure 3:
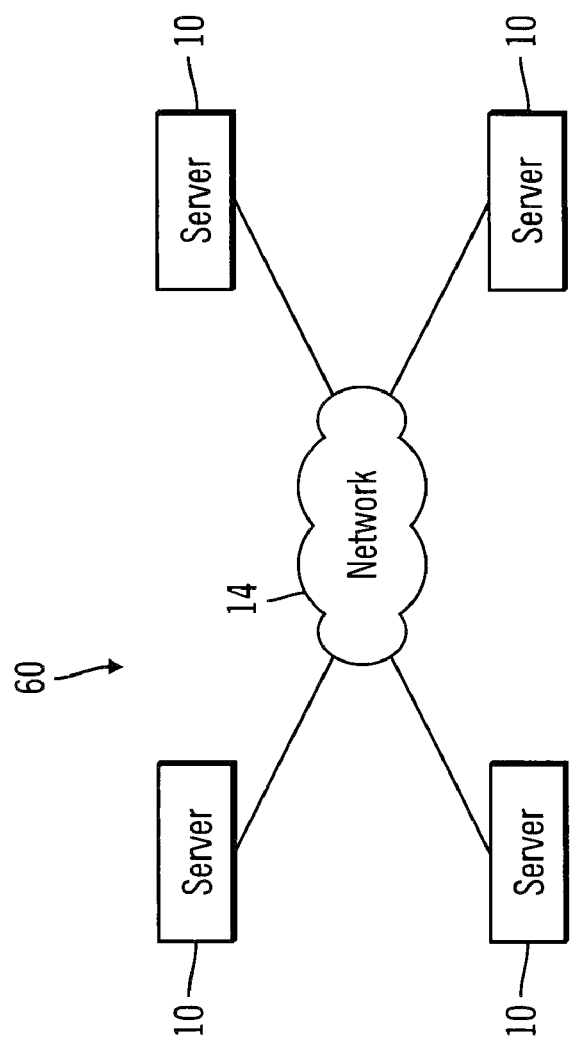
FIG. 3 is a schematic representation of one embodiment of a communications network through which the messaging method and system of the present invention may be implemented.

Referring to FIG. 3, in one embodiment, the messaging server 60 comprises many servers 10 that are inter-connected via a communication network 14, such as a landline telephone network or an IP network, with each server 10 having the full functionality of a messaging server as described above, however each serving a different geographical region, for example. Details of various hardware and software components comprising the communication network 14 are not shown (such as servers, routers, gateways, etc.) as they are well known in the art. Further, it is understood that access to the communication network 14 by the servers 10 may be via suitable transmission medium, such as coaxial cable, telephone wire, wireless RF links, or the like. Communication between the servers 10 takes place by means of an established protocol. Depending on the recipient's device location, the messaging server 60 may provide a unique access address in the message notification to the recipient, which is directed to retrieve the sender's message from a server 10 located in the same region as the recipient's device. For example, a sender can forward a voice message to a recipient in another country. The message server 60 would determine the country based on the recipient address specified by the sender, and route the sender's voice message to a server 10 that serves that country. Upon notification, the recipient could simply retrieve the sender's voice message from the server 10 that is located in his local region, instead of making a long distant call to a messaging server located in another country or region. In one embodiment, if the connectivity is IP-based, the message is retained on the originating server and is retrieved over IP by the destination server at runtime. This ensures that only one copy of the message is maintained on a server when the same message is sent to multiple recipients. The sender's voice message may be routed to the local server in another country via an IP network, telephony network, a broadband network, etc. The notification message to the recipient may be sent via a different network, such as a cellular network.

Figure 4:
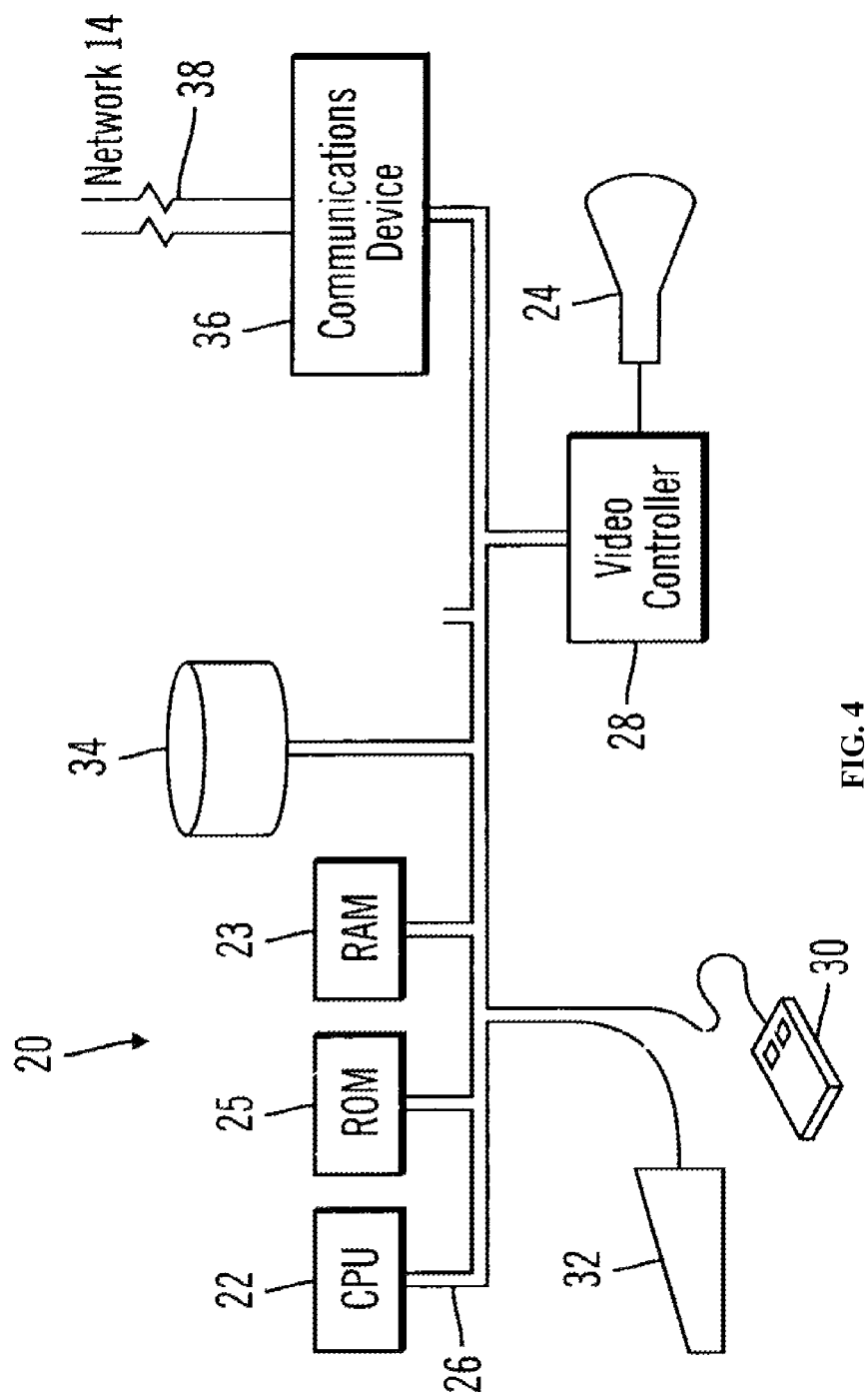
FIG. 4 is a schematic representation of one embodiment of a computer system that facilitates the messaging method, and system of the present invention.

Turning now to FIG. 4, there is schematically illustrated one embodiment of a computer system 20 which may be configured as the messaging server 60 for receiving, storing and/or transmitting messages. The computer system 20 communicates with the communication network 14, which may include IP networks, cellular networks and PSTN's. The computer system 20 includes a processor 22, internal random-access memory ("RAM") 23 and read-only memory ("ROM") 25, and data bus architecture 26 for coupling the processor 22 to various internal and external components. The computer system 20 further includes a communication device 36 which, in turn, is coupled to a communication channel 38 for effecting communication with the network 14. A mass storage device 34, such as a hard disk drive or floppy disk drive or CD-ROM drive, is coupled to the processor 22 for storing utility and application software (including a suitable web browser for navigating the Internet network) and other data. The application software is executed or performed by the processor 22.

Input devices controlled by the user are also coupled to the processor 22, including a cursor positioning device 30 and a keyboard 32 in accordance with the present invention. The cursor positioning device 30 is representative of any number of input devices that produce signals corresponding to a cursor location on a display 24, and may include by way of example, a mouse, a trackball, an electronic pen, or a touchpad, which may be an integral part of the keyboard 32. The display 24 is coupled to the processor 22 through a video controller 28. The video controller 28 coordinates the presentation of information on the display 24 in one or more windows.

The messaging server 60 herein described may be coupled to, without limitation, distributed information exchange networks, such as PSTN, cellular network, public and private computer networks (e.g., Internet, Intranet, WAN, LAN, etc.), value-added networks, communications networks (e.g., wired or wireless networks), broadcast networks, and a homogeneous or heterogeneous combination of such networks. The notification message to the recipient may be sent via one or a combination of such networks. The recipient may retrieve the data file via one or a combination of such networks. As will be appreciated by those skilled in the art, the networks may include both hardware and software and can be viewed as either, or both, according to which description is most helpful for a particular purpose. For example, the messaging server 60 can be described as a set of hardware nodes that can be interconnected by a communications facility, or alternatively, as the communications facility, or alternatively, as the communications facility itself with or without the nodes. It will be further appreciated that the line between hardware and software is not always sharp, it being understood by those skilled in the art that such mediums and communications facility involve both software and hardware aspects.

Cross-reference is made to U.S. patent application Ser. No. 10/852,849, now U.S. Pat. No. 7,483,525, titled "Method And System For Selecting A Communication Channel With A Recipient Device Over a Communication Network", which was concurrently filed on May 24, 2004, and commonly assigned to the assignee of the present invention. Cross-reference is also made to U.S. patent application Ser. No. 10/852,848, titled "Method and System for Establishing a Teleconference Over a Telephony Network", which was concurrently filed on May 24, 2004, and commonly assigned to the assignee of the present invention. These patents are incorporated by reference herein as if fully set forth herein. These patents disclose methods and systems for further applications of the present invention. For example, the present invention may be used to develop a teleconferencing system that notifies targeted participants to be invited to a teleconference initiated by an initiator. A unique access address may be associated with each different telephone conference, to be included in a notification message to the participants. The participants can join in the teleconference by accessing the unique access address. Further, the notification aspect of the present invention may be one of the available options for selection to be the best available mode or channel of communicating with a recipient.

A method or process is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Useful devices for performing the operations of the present invention include, but are not limited to, general or specific purpose communication, digital processing and/or computing devices, which devices may be standalone devices or part of a larger system. For example, the messaging server 60 may be implemented as a unitary physical device, or a combination of several separate discrete physical devices operationally coupled together to form a functional messaging server, each with one or more dedicated functions. The devices may be selectively activated or reconfigured by a program, routine and/or a sequence of instructions and/or logic stored in the devices. In short, use of the methods described and suggested herein is not limited to a particular processing configuration.

It is appreciated that detailed discussion of the actual implementation of the messaging server 60 and other functional components disclosed herein is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation.

Accordingly, it is to be understood that the invention is not to be limited by the specific illustrated embodiments, but only by the scope of the appended claims.

We claim:

1. A method of transmitting a data file from a sender to a recipient, comprising the steps of:
    receiving said data file sent from a sender device by a messaging server;
    said messaging server associating said data file with a unique access address;
    said messaging server associating said unique access address with a notification message;
    said messaging server transmitting said notification message to said recipient, wherein:
        said notification message is not sent while the sender device is accessing the messaging server and said notification message is queued for later delivery; and
        said messaging server transmits said notification message to said recipient based on contact information of said recipient;
    said recipient accessing said unique access address to retrieve said data file;
    said messaging server identifying the unique access address used by the recipient; and
    said messaging server transmitting said data file corresponding to the unique access address to said recipient.

2. The method of claim 1, wherein said notification message is sent within at least one of a text message, a voice message and an electronic mail.

3. The method of claim 1, wherein said step of transmitting said data file to said messaging server by said sender comprises the steps of:
    speaking a voice message into said sender device; and
    converting said voice message to text using speech-to-text processing.

4. The method of claim 1, wherein said step of transmitting said data file to said messaging server by said sender comprises the steps of:
    inputting a text message into said sender device; and converting said text message to a voice message using text-to-speech processing.

5. The method of claim 1, wherein more than one data file is transmitted, and wherein a different unique access address is associated with a different data file.

6. The method of claim 1, wherein said step of said messaging server identifying the unique access address comprises the steps of:
    messaging server determining a dialed access phone number with a dialed number identification service (DNIS); and
    messaging server determining a data file associated with said dialed access phone number.

7. The method of claim 6, wherein said step of said recipient accessing said unique access address to retrieve said data file further comprises the step of authenticating the recipient.

8. The method of claim 7 further comprising the step of the sender designating a recipient device address to which the notification message is to be transmitted, and the step of authenticating the recipient includes the step of verifying one of said recipient contact information and personal identification information wherein said personal identification information comprises at least one of name, user identification number and personal identification number code.

9. The method of claim 1 wherein the data file is transmitted over a cellular network, wherein the sender has a sender cellular device and the recipient has a recipient cellular device, and wherein the sender transmits the data file using the sender cellular device, and the recipient accesses the unique access address to retrieve the data file using the recipient cellular device.

10. The method of claim 9, wherein the notification message is sent via text messaging to the recipient cellular device.

11. The method of claim 10, wherein the sender cellular device communicates with a first cellular network to which the sender subscribes, and the recipient cellular device communicates with a second cellular network to which the recipient subscribes.

12. The method of claim 1, wherein said data file is transmitted to said messaging server over a first communication network, and wherein said notification message is transmitted to said recipient over a second communication network.

13. The method of claim 1, wherein said first communication network and said second communication network are disparate networks.

14. The method of claim 1, wherein said sender device stores contact information to keep recipient contact information of said sender updated within an address book stored on said messaging server, and wherein said messaging server periodically queries said sender device for detecting changes in said stored contact information of said recipient.

15. A messaging server for transmitting a data file from a sender to a recipient, said messaging server comprising:
    a data receiver receiving said data file from a device of said sender;
    a notification message transmitter associating said data file with a unique access address and associating said unique access address with a notification message, and transmitting said notification message to said recipient, wherein:
        said notification message is not sent while the sender is accessing the messaging server and said notification message is queued for later delivery; and
        said messaging server transmitting said notification message to said recipient based on said recipient contact information;
    a data file transmitter providing access to a recipient using said unique access address, and transmitting said data file from said messaging server to a device of said recipient.

16. The messaging server of claim 15, wherein said sender device stores contact information to keep recipient contact information of said sender updated within an address book stored on said messaging server, and wherein said messaging server periodically queries said sender device for detecting changes in said stored contact information of said recipient.

17. A non-transitory machine-readable storage medium for programming a messaging server to forward a data file from a sender device to a recipient device, said medium including processor executable instructions comprising:
    a first program module in said messaging server, said first program module configured to receive said data file from said sender device associated with a sender;
    a second program module in said messaging server, said second program module configured to associate said data file with a unique access address, said second program module configured to associate said unique access address with a notification message, said second program module configured to transmit said notification message to said recipient, and wherein:
        said second program module configured to not send said notification message when said messaging server is being accessed by said sender device and queue said notification message for later delivery; and
        said second program module configured to transmit said notification message to said recipient device based on said recipient contact information;
    a third program module for transmitting said data file corresponding to said unique access address from said messaging server to said recipient device of said recipient.

18. The non-transitory machine-readable storage medium of claim 17, further comprising a fourth program module configured for providing access to the recipient device to retrieve said data file.

19. The non-transitory machine-readable storage medium of claim 17, further comprising a fifth program module configured for identifying said unique access address used by said recipient device.

* * * * *